Dec. 3, 1957     B. OSTROFSKY ET AL     2,815,302
FILM RESISTORS

Filed March 12, 1954     2 Sheets-Sheet 1

INVENTOR.
BERNARD OSTROFSKY
JAMES W. BALLARD
BY Toulmin & Toulmin
ATTORNEYS

Dec. 3, 1957 B. OSTROFSKY ET AL 2,815,302
FILM RESISTORS
Filed March 12, 1954 2 Sheets-Sheet 2
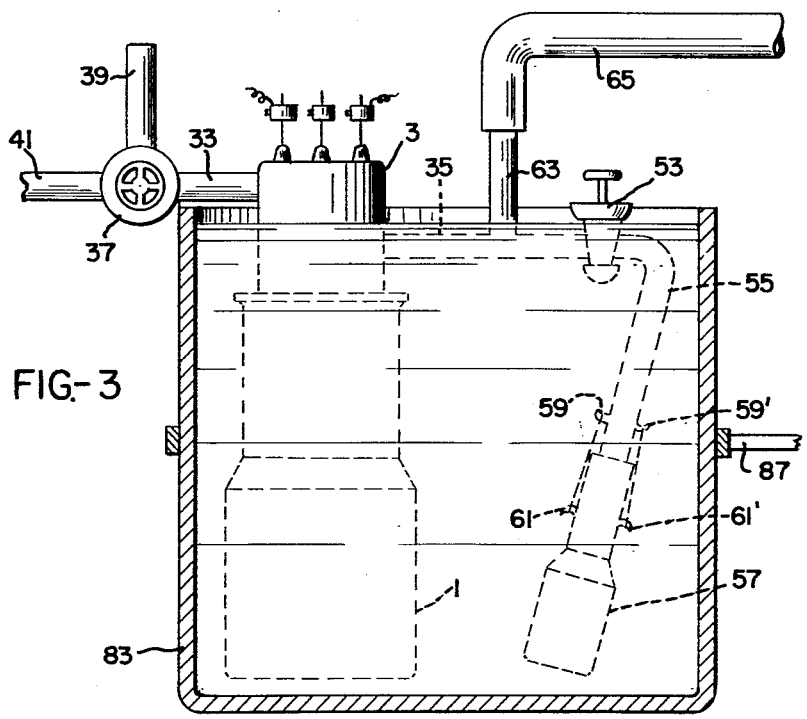
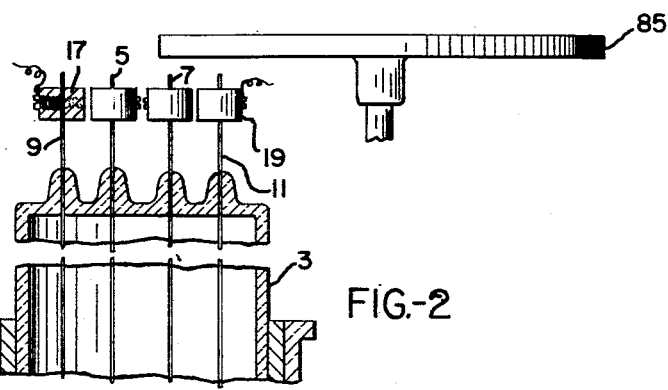
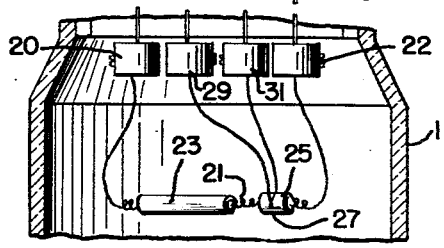
INVENTOR.
BERNARD OSTROFSKY
JAMES W. BALLARD
BY
Toulmin & Toulmin
ATTORNEYS United States Patent Office 2,815,302
Patented Dec. 3, 1957

2,815,302

FILM RESISTORS

Bernard Ostrofsky and James W. Ballard, Dayton, Ohio, assignors to The Commonwealth Engineering Company of Ohio, Dayton, Ohio, a corporation of Ohio Application March 12, 1954, Serial No. 415,869

10 Claims. (Cl. 117—229)

This invention relates to the production of electrical resistance elements and particularly to electrical resistance elements having a glass base on which an electrically resistant film of metal is deposited by the thermal decomposition of a heat decomposable chromium bearing compound.

In our co-pending application Serial No. 398,000, filed December 14, 1953, and assigned to the same assignee as the present invention, we have described the production of chromium coated ceramic bases which are extremely useful as resistor elements due to their high degree of stability the average temperature coefficient of resistance over a wide range of temperatures and resistance values being materially less than 0.1 of 1% and in most cases being substantially zero.

Heretofore however the chromium films deposited on glass bases did not exhibit these extremely low values of temperature coefficient of resistance. Most chromium resistive films on borosilicate glasses while showing a high, controllable degree of ohmic resistance were so affected by temperature that the average temperature coefficient of resistance for a series was about 0.3 of 1% /° C. over the temperature range of −55° C. to 105° C. and the specific values of given resistors was from about 0.1 to 0.4% /° C.

We have now found that when chromium is deposited on a borosilicate glass such as Pyrex that the temperature coefficient of resistance, quite unexpectedly, may be materially improved by heating the resistor element at substantially red heat; most suitably this heating is effected in a reducing atmosphere. The heating not only improves the temperature coefficient but also is advantageous with respect to the adhesion of the chromium to the glass since the metal film is substantially burned into the glass in the process of invention.

This combination of factors is particularly important with respect to the production of resistors having values in the megohm range. Such are produced by initially forming a complete film of the metal on the glass and then cutting a spiral form in the metal to attain the high resistance element. With the structure of invention the temperature coefficient is not affected by such cutting and the cutting itself is very cleanly and accurately achieved due to the intimate relation between the glass and the burned in chromium film.

The invention will be more fully understood by reference to the following detailed description and accompanying drawings wherein:

Figure 2 is a view of a portion of the apparatus of Figure 1;

Figure 3 is another view of a portion of the apparatus of Figure 1;

Figure 1:
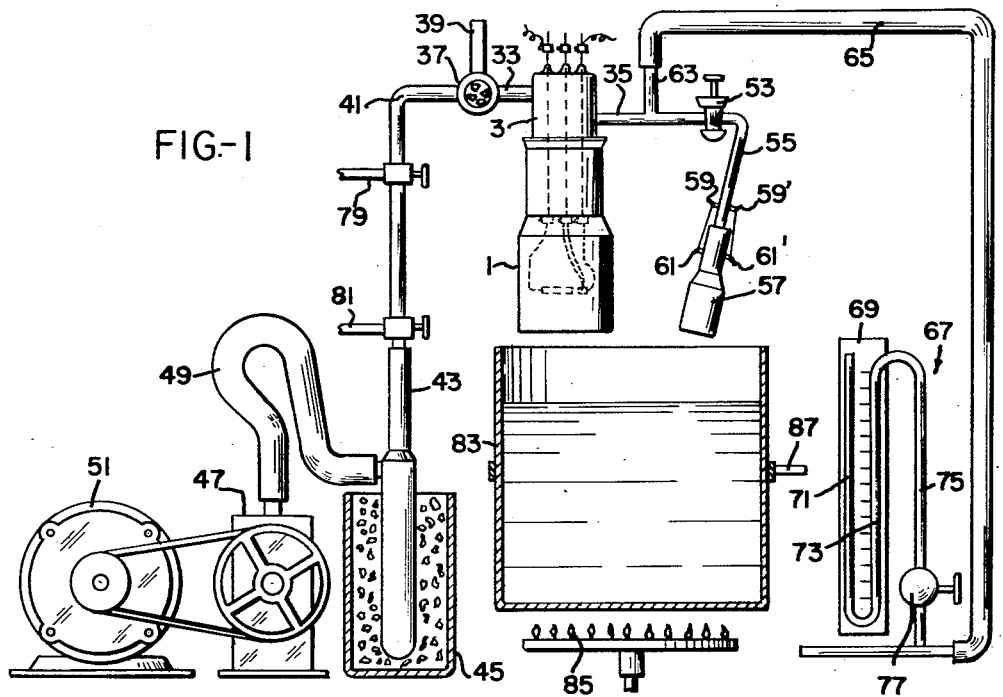
Figure 1 is a view illustrating apparatus useful in the practice of the invention.

Referring to the drawings there is shown in Figure 1 a plating chamber in the form of a glass vessel 1 having a glass closure member 3 removably sealed into the mouth thereof. The sealing is effected by provision of ground glass surfaces on the vessel and closure member, this type of sealing being most effective with chromium hexacarbonyl vapors.

Figure 4:
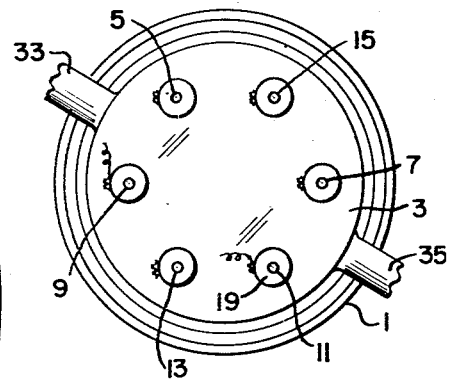
Figure 4 is a plan view of a portion of the apparatus of Figure 1.

Closure member 3 is hollow, closed at its upper end and extends well above the mouth of the vessel 1. On the top of the closure member the same is provided with six glass protuberances each of which has sealed therethrough a tungsten electrode. These electrodes are conveniently provided in pairs indicated respectively at 5, 7; 9, 11; and 13, 15 (Fig. 4).

For purposes hereinafter described the electrodes 13, 15 may be considered as spares utilizable to take any desired measurement and not necessary to the practice of the invention. The electrodes themselves extend well down into the vessel 1 and the lower end of each is provided with an electrically conductive collar of brass having an aperture through which the electrode passes vertically; each collar also is provided with a threaded passage in which a set screw is engaged in contact with the electrode to securely hold the collar in position on the electrode.

A second threaded passage is provided in each collar for the passing of a second set screw which communicates with a second aperture in which electrical leads are secured by the set screws. These collars will be referred to more particularly hereinafter.

Collars 17, 19 on the upper ends of the electrodes 9, 11 are connected to a 6.3 source of A. C. voltage; at the lower ends of these electrodes a coil of Nichrome wire 21 is connected to the electrodes by set screws on collars 20, 22, respectively. This coil is adapted to receive thereover a tubular Pyrex glass member 23 having a length of about 1 inch and a diameter of $7/16$ inch which is to be plated with the film deposited from the vapors of the chromium hexacarbonyl. A second and smaller tubular Pyrex glass member 25 is retained on the coil 21 in adjacent relationship to the member 23. Secured against the piece or member 25 is the hot juncture 27 of a Chromel-Alumel thermal couple the cold ends of which are respectively connected to collars 29, 31 on electrodes 5, 7, the lead being retained by set screws threaded into the collar.

The upper ends of electrodes 5, 7 have connected thereto a milli-volt meter (not shown) and the voltage developed between electrodes 5, 7 is accordingly a measure of the temperature at the Pyrex glass member 25 and also 27 which is closely adjacent to the member 23. Such equipment for temperature measure is not described in further detail herein since the practice and equipment involved are well known standard industrial procedures.

The closure member 3 above the mouth of the vessel 1 is also provided on opposed sides thereof with tubular laterally extending arms 33, 35 which communicate with the hollow interior of the member 3 and accordingly with the interior of the vessel 1 (Figure 1).

Arm 33 is provided with a three-way (glass) valve 37 which permits of connecting the arm and accordingly the vessel 1 with the atmosphere through the conduit 39; the arm 33 may also be connected through valve 37 with arm extension 41, the lower end of which is provided with a ground glass surface secured to an upper ground glass surface of conduit 43; or valve 37 may be closed to seal off the arm 33 and the vessel 1 from the atmosphere and conduit 43 at the same time.

Conduit 43 has the lower end thereof closed to define a receiver contained in a trap, which trap comprises a casing 45. Casing 45 and the receiver have therebetween a cooling medium, preferably a mixture of Dry Ice and acetone, and the trap functions to effectively condense and retain vapors passing through the conduit 43.

Conduit 43 above the trap is connected to a pump 47 through line 49, the pump when driven by motor 51 being effective to create a vacuum pressure to occasion the control of gases through conduit 43 and arm extension 41 from the vessel 1.

Extending rightwardly from the closure member 3 as shown in Figure 1 arm 35 is provided with a valve 53 and the lower end of arm extension 55 has a ground glass surface which is securable with the upper ground glass surface of a container 57.

In order to securely and removably position container 57 on the arm extension 55 projections indicated at 59, 59' are provided on arm 55 and projections 61, 61' are provided on container 57, and rubber bands may be extended between arms to securely and removably retain the container in association with the arm extension.

Container 57 is provided in the base thereof with a supply of substantially pure chromium hexacarbonyl in solid form. In actual practice it has been found that chromium hexacarbonyl which leaves a solid residue of approximately one percent by weight is entirely suitable for the practice of the invention. The carbonyl when heated to about 100° C. volatilizes readily and when the vaporized material is brought into contact with a surface heated to a temperature in the range of 125° to 200° C. the composition decomposes to produce a metallic deposit.

Conduit 63 of glass is positioned between closure member 3 and valve 53 and is connected by suitable means such as rubber hosing 65 to a manometer indicated generally at 67. This manometer is of standard construction, provided with mercury and is adapted to indicate low pressures, and it is not considered necessary to specifically describe the manometer in detail since the same is merely an indicating instrument in the process of invention and the procedures of employing the same are well known, but it may be noted for the sake of clarity that the manometer tubings are mounted on a board 69, the longer mercury column being contained in the left tubing 71 (Figure 1), the shorter column being in tubing 73 which is connected to tube 75 provided with valve 77; the horizontal tubing connected to valve 77 is closable at the left hand end (Figure 1). Gas pressure exerted through conduit 65 accordingly passes through column 75 to alter the height of the column of the manometer when valve 77 is open. Normally in the practice of the invention valve 77 is maintained open at all times.

Brackets, portions of which are indicated at 79, 81 suitably and adjustably support the vessel 1 and conduit 43. Positioned below the vessel 1 and the container 57 is a receptacle 83 which is adapted as a water bath and which may be heated by gas flame indicated at 85, the water, in the practice of the invention, being brought to practically 100° C., that is the boiling point. The bath is suitably supported by brackets 87 and may be raised or lowered to immerse the vessel 1 and the closure member 3 in such manner that the arms 33, 35 and the vessel 57 are completely within the bath.

In the practice of the invention the apparatus is connected as shown in Figure 1 with valve 37 open to the conduit 43 and the valve 53 open to the container 57, the Pyrex glass member 23 being supported on the Nichrome wire 21. In this condition the vacuum pump is operated to completely clear the system of air. At the same time the 6.3 volt A. C. source is connected across the electrodes 9, 11 to supply thereto a current which heats the coil element 21 and thereby also heating the Pyrex glass member 23 and the Pyrex glass member 25. This heating takes place preferably as the evacuation occurs in order that any occluded gases included in the Pyrex glass material may be expelled from the system. The glass materials themselves are cleaned prior to their introduction into the vessel 1, the cleaning being effected in any suitable manner known to the art as with alcohol.

When the apparatus has been substantially completely exhausted of gases the valve 53 is closed and the vessel 1 and container 57 are lowered into the water bath to such an extent that the arms 33, 35 are substantially completely covered by the water, which has in the meanwhile been heated to about 100° C. Valve 37 is at this time open to conduit 43 and the motor and pump continue to operate and accordingly any further material which may be contained, for example, in the vessel 1 is expelled by the heating. Also the heated water occasions a development of a high vapor pressure in the container 57 and the arm extension 55, but the gases cannot pass the tightly fitting glass valve 53.

When the temperature of the Pyrex glass members 23, 25, as indicated by the thermocouple positioned at 27, have reached a temperature of approximately 150° C. valve 53 is opened to admit to the vessel 1 and the hollow closure member 3 vapors of chromium hexacarbonyl. Prior to opening valve 53 valve 37 is closed to shut off arm 33 from the atmosphere and the arm extension 41. The conduit 63 however is open and some very slight condensation of chromium hexacarbonyl may appear on the glass wall of this conduit; this is not however of serious effect.

When the pressure within the vessel 1 and closure member 3 has reached a point of one-half centimeter of mercury valve 53 is closed to prevent further ingress of carbonyl to the vessel 1. Then with the substantially static atmosphere of carbonyl in the vessel the same is maintained in the water bath for a period of five minutes. During the course of this period the carbonyl decomposes depositing a film over the Pyrex glass member 23 which, due to its suspended condition and the uniform heating of the closely wound coil 21, is uniformly coated with the deposit. The deposition which also takes place to some extent upon the glass piece 25 is not deleterious to the temperature measurement.

In this connection it is to be noted that the prime requisite is that the temperature of the glass pieces be brought to a temperature within the range of 125–200° C. prior to the introduction of the carbonyl and that the heating be continued at substantially the same rate during the deposition. As the carbonyl decomposes the pressure as indicated by the manometer 67 will be observed to increase slightly as gaseous products of the decomposition, such as CO, are formed.

Figure 5:
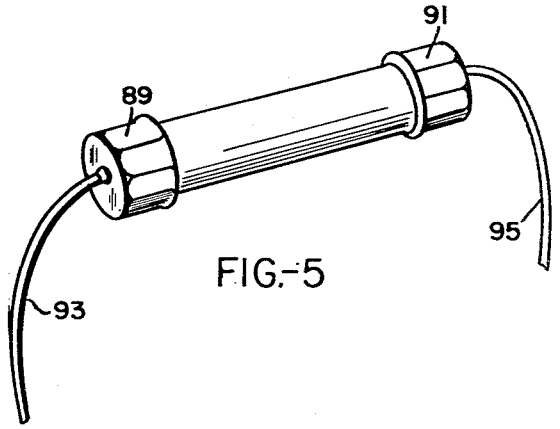
Figure 5 illustrates a completed electrical resistance element.

At the termination of five minutes in the above specific example the valve 37 was opened to connect the arm 33 to the pumping apparatus and the same was evacuated of substantially all gases. The vessel 1 and container 57 were removed from the water bath and valve 37 was operated to connect conduit 39 and the atmosphere with the arm 33 and the vessel 1. The closure member 3 and the glass piece suspended from the electrodes were then removed from the vessel. Upon removal and cooling to room temperature the coated glass tubular member 23 is provided, as shown in Figure 5, with silver terminal caps 89 and 91 having axial terminal leads 93 and 95, respectively, substantially negligible contact resistance is thus achieved.

The resistance of the Pyrex glass member, which has a length of about 1 inch and an outside diameter of about 7/16 of an inch, was found to be about 1306 ohms at room temperature or 27.7° C.

Resistors made in the manner described are usually checked over the range of temperatures from minus 55° C. to 105° C. in order to determine the average temperature coefficient of resistance per degree centigrade. When checked the values of the coefficient for resistors made as described hereinbefore showed a temperature coefficient of 0.3 percent per degree centigrade. Such a coefficient is high for suitable commercial operations and is particularly deleterious to resistors which have metal removed therefrom to provide resistance values in the megohm range.

We have unexpectedly found that if such resistors are held in the reducing portion of a Bunsen burner flame until they attain red heat that the characteristics and specifically the temperature coefficient of resistance of such resistors are materially improved, in fact, by so treating such resistors the average temperature coefficient has been reduced from 0.3 percent to 0.03 percent per degree centigrade, a reduction of ten times. However such operations with a Bunsen burner require considerable skill as the resistor must not be subjected to oxidizing conditions because such causes the film to oxidize and to have poor adherence to the glass base.

A preferred mode of operation is upon completion of the deposition of metal to completely evacuate the apparatus of Figure 1 to provide a substantially complete vacuum in vessel 1 and to then raise the temperature of the metal coated glass to at least 800° F. and preferably up to red heat. The maximum temperature is limited only by the softening point of the glass.

In order to insure of no oxidation the heating in the vessel 1 may take place in an atmosphere of hydrogen, in which case the source of hydrogen is connected to arm extensions 55 (Figure 1) replacing container 57 and hydrogen is allowed to flow slowly into the evacuated chamber during the heating of the resistor. The vacuum pump is preferably operated at this time to continuously remove the gas from the vessel 1.

Resistors produced under this most beneficial condition will be found to have a value of average temperature coefficient of resistance as low as 0.01 percent. The materially improved resistor performance attained by heating the glass-metal film in a non-oxidizing atmosphere is, as already noted, beneficial with resistors of low resistance values as well as resistors having resistance values in the megohm range. The latter resistor may be produced simply by cutting a suitable spiral in the completed resistor.

It is further to be particularly noted that the physical adherence between glass and the metal film is materially improved by the heat treatment and this factor assists the cutting of the spiral since clean cuts made be readily made. However, if desired, the cutting may be effected before the firing operation.

It may be further noted with respect to the adherence that the terminal caps themselves are improved in adherence to the metal film. An examination of samples produced indicates that some slight amount of sintering may take place.

The borosilicate glasses because of their thermal endurance and their low temperature coefficient of expansion (as low as 3.0 x 10$^{-6}$) are of particular utility in the practice of the invention, but other glasses and particularly glasses which are high in silica, may suitably be employed.

It will be understood that this invention is susceptible to modification in order to adopt it to different usages and conditions and accordingly, it is desired to comprehend such modifications within this invention as may fall within the scope of the appended claims.

We claim:

1. In a process of improving the average temperature coefficient of resistance of an electrical resistor comprised of a glass base and a metal film consisting of chromium thereon, the step of firing the film and base at a temperature to just below the softening point of said glass and while retained in a non-oxidizing atmosphere, said firing temperature being at least 800° F. whereby the metal film is substantially burned into the glass.

2. In a process of improving the average temperature coefficient of resistance of an electrical resistor comprised of a high silica glass base and a chromium metal film thereon, the step of firing the film and base at a temperature to just below the softening point of said glass and while retained in a non-oxidizing atmosphere, said firing temperature being at least 800° F. whereby the metal film is substantially burned into the glass.

3. In a process of improving the average temperature coefficient of resistance of an electrical resistor comprised of a glass base and and a chromium metal film thereon, the step of firing the film and base at a temperature to just below the softening point of said glass and while retained in a reducing atmosphere, said firing temperature being at least 800° F. whereby the metal film is substantially burned into the glass.

4. In a process of improving the average temperature coefficient of resistance of an electrical resistor comprised of a glass base and a chromium film thereon, the step of firing the film and base at a temperature to just below the softening point of said glass and while retained in a reducing atmosphere, containing hydrogen, said firing temperature being at least 800° F. whereby the metal film is substantially burned into the glass.

5. In a process of improving the average temperature coefficient of resistance of an electrical resistor comprised of a borosilicate glass base and a chromium film thereon, the step of firing the film and base at a temperature of about 800° F. and below the softening point of the glass in a non-oxidizing atmosphere.

6. A process for producing electrical resistors which comprises providing a glass base, depositing from chromium hexacarbonyl a thin film of chromium on the base in an evacuated and non-oxiding atmosphere, and heating the chromium and base in the evacuated atmosphere to substantially red heat to improve the temperature coefficient of resistance and the adhesion of the deposited film to the glass.

7. A heat-treated electrical resistor having an average temperature coefficient of resistance of less than about 0.3 percent, said resistor consisting of a glass base having a film of chromium metal thereon, said chromic metal film being burned therein by heat-treating the metal coated glass base to at least 800° F.

8. A heat-treated electrical resistor having an average temperature coefficient of resistance in the range of about 0.01 to 0.03 percent, the resistor comprising a borosilicate glass base having low temperature coefficient of expansion, and a chromium metal film adherent on the glass base, said chromic metal film being burned therein by heat-treating the metal coated glass base to at least 800° F.

9. A heat-treated electrical resistor having resistance to thermal shock and a low average temperature coefficient of resistance and on the order of 0.03 percent per degree centigrade over a temperature range of minus 55° C. to 105° C., said resistor comprising a base of borosilicate glass and a film of chromium metal forming an adherent coating thereon, said chromic metal film being burned therein by heat-treating the metal coated glass base to at least 800° F.

10. A heat-treated electrical resistor of high resistance value having an average temperature coefficient of about 0.01 percent, the resistor being comprised of a glass base having a thermal endurance and a low temperature coefficient of expansion, and an adherent metal coating film of chromium on the glass base, said chromic metal film being burned therein by heat-treating the metal coated glass base to at least 800° F.

References Cited in the file of this patent

UNITED STATES PATENTS

| | | |
|---|---|---|
| 1,739,256 | Pender | Dec. 10, 1929 |
| 1,964,322 | Hyde | June 26, 1934 |
| 1,991,774 | Spencer | Feb. 19, 1935 |
| 2,047,350 | Alexander | July 14, 1936 |
| 2,047,351 | Alexander | July 14, 1936 |
| 2,118,795 | Littleton | May 24, 1938 |
| 2,357,473 | Jira | Sept. 5, 1944 |
| 2,522,531 | Mochel | Sept. 19, 1950 |
| 2,733,325 | Cox | Jan. 31, 1956 |